July 17, 1962  J. N. JACQUET ET AL  3,045,157
DIRECT COMPARISON DIGITAL SERVOSYSTEM
Filed July 14, 1959  7 Sheets-Sheet 1

INVENTORS
JACQUES N. JACQUET
GUY A. E. HENRY
BY Kurt Kelman
AGENT

INVENTORS
JACQUES N. JACQUET
GUY A.E. HENRY
BY Kurt Kelman
AGENT

July 17, 1962   J. N. JACQUET ET AL   3,045,157
DIRECT COMPARISON DIGITAL SERVOSYSTEM
Filed July 14, 1959   7 Sheets-Sheet 4

Fig. 7.

INVENTORS
JACQUES N. JACQUET
GUY A. E. HENRY
By Kurt Kelman
AGENT

July 17, 1962   J. N. JACQUET ET AL   3,045,157
DIRECT COMPARISON DIGITAL SERVOSYSTEM
Filed July 14, 1959                      7 Sheets-Sheet 7

INVENTORS
JACQUES N. JACQUET
GUY A. E. HENRY
BY Kurt Kelman
AGENT

United States Patent Office 3,045,157
Patented July 17, 1962

3,045,157
DIRECT COMPARISON DIGITAL SERVOSYSTEM
Jacques N. Jacquet, Paris, and Guy A. E. Henry, Bourg-la-Reine, France, assignors to Societe Nouvelle d'Electronique, a corporation of France
Filed July 14, 1959, Ser. No. 826,937
Claims priority, application France July 30, 1958
7 Claims. (Cl. 318—28)

This invention relates to digital servo systems for matching the positions represented by two digital binary numbers delivered respectively by a reference member and by a controlled member movable over a prescribed path and more particularly pertains to a system wherein the two numbers are compared in order to determine an error information utilized to energize a servomotor which moves the controlled member in a sense corresponding to the shorter of the two possible paths.

There are two possible methods for effecting this comparison between two numbers. The first one consists in obtaining the error information by calculating the difference between the two numbers; this requires generally a considerable amount of complex circuitry and imposes a serial transmission of at least one of the numbers. The second method consists in obtaining a set of error informations by comparing the numbers digit by digit, said informations characterizing the sense of the difference between the compared digits.

The digital servo system as per the invention utilizes a comparison process of the second type. The unique principles involved allow its operation on numbers expressed either in natural binary or in reflected binary code.

The circuits constituting the comparator are very simple and do not become more complex when the number of digits of the compared numbers increase; they also allow for parallel or serial transmission of the numbers.

A broad object of the invention is to provide an improved digital servo system for controlling accurately the position of a movable member by energizing a reversible drive motor by means of an error information obtained from the digit-by-digit comparison of two binary numbers, the first number characterizing the present position of the movable member and the second number characterizing the new or command position of said member.

It is a further object of the invention to provide a digital servo system operating on substantially the same general comparison principle when both numbers are expressed either in the natural binary code or in the reflected binary code and when either or both numbers are transmitted in serial or parallel form.

It is another object of the invention to provide a digital servo system wherein the present-position and command-position numbers can both be generated by movable members in order to synchronize their displacements.

In order that the invention may be clearly understood and readily carried into effect, it will now be more fully described with reference to the accompanying drawing. It is to be expressely understood, however, that the drawing is for the purpose of illustration and description only and is not intended as a definition of the limits of the invention.

Figure 1:
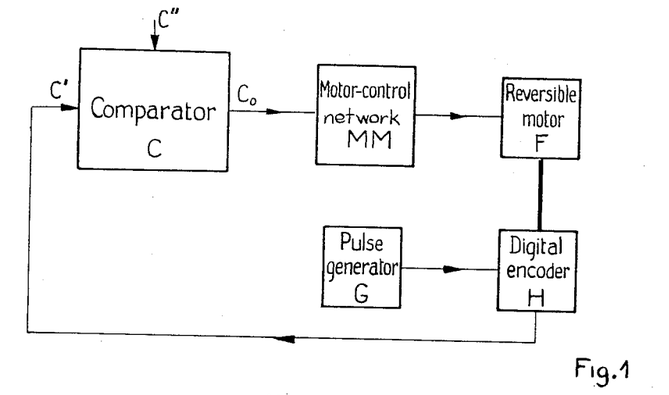
FIGURE 1 is a block diagram of the digital servo system.

In the drawings:

FIGURE 1 is a block diagram of the general system according to the invention which operates on two $n$-digit binary numbers.

A logical comparator C comprises two $n$-channel inputs to which are respectively applied the digits $D1$ to $Dn$ of the first number and the digits $D'1$ to $D'n$ of the second number. The result of the comparison, which represents the sense of the error, is available in analogue form on output $C_0$ and energizes, in the proper direction, a drive motor F to rotate the controlled shaft until the two compared numbers match.

The generator G delivers pulses which are applied to a digital coding device H which is mechanically tied to the motor F. This coding device delivers the number of present position and is designed in such a way that it delivers on each of its discrete positions the $n$ digits characterizing this position. Each of these digits is transmitted on one of two channels, respectively assuming the binary values $\underline{0}$ and $\underline{1}$. These numbers are then applied to input $C'$ of comparator C. The number designating the command position is obtained as is well known in the computing art and is applied, over $n$ channels, to input $C''$ of comparator C.

The digital comparator C comprises a number of elementary diode logical "AND" and "OR" circuits, as described in the book "Digital Computer Components" by R. K. Richards, pages 36 to 64, in the chapter entitled "Diode Switching Circuits." However it is evident that the operation of the device is not restricted to the use of diodes and any other kind of elementary logical circuits can as well be utilized.

These elementary logical circuits will first be described in FIGURES 2, 3, 5, 6 and 7.

Figure 2:
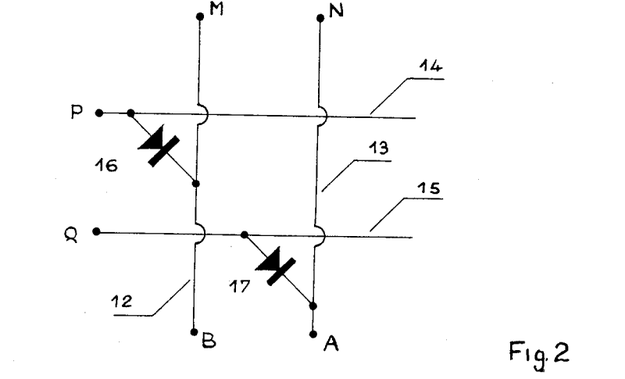
FIGURE 2 is a schematic diagram of a direct-comparison matrix for determining the sense of the error between two binary numbers.

FIGURE 2 represents an elementary logical diode matrix comprising two vertical conductors or lines 12, 13 and two horizontal lines 14, 15. A diode 16 is placed at the crossing point of lines 12 and 14 and a diode 17 at the crossing point of lines 13 and 15. The matrix is utilized for the comparison of two binary numbers. One of these is applied to input M or N of lines 12 and 13 and the other to input P or Q of lines 14 and 15. The result of the comparison is obtained on output terminal A or B.

The presence of a number on input M or N is materialized by the application of a negative voltage $-U$ to terminal M if the number is $\underline{0}$ or to terminal N if the number is $\underline{1}$. The presence of a number on input P or Q is materialized by the application of a negative voltage −V to terminal P if the number is 1 or to terminal Q if the number is 0, the other terminal being brought to zero or ground potential. The two voltages satisfy the inequality |V−U|>1.

If number 0 is for example applied to both sets of input terminals, diode 16 is conducting and diode 17 is non-conducting. Consequently no output voltage appears on either terminal A or B. It is the same when number 1 is applied to both sets of input terminals.

If now number 0 is applied to input terminals M, N and number 1 to P, Q, diode 16 is non-conducting and a voltage −U appears on terminal B.

Conversely, if number 1 is applied to terminals M, N, and number 0 to P, Q, a voltage −U appears on terminal A.

This circuit, which will be called a direct-comparison matrix MS, realizes the direct comparison of two binary numbers by delivering a zero voltage on its output buses when both numbers are matched and a given voltage on one or the other of its two output terminals when they are mismatched, the choice of the proper terminal depending on the combination of numbers 0 and 1 applied to input terminals M, N and P, Q.

Figure 3:
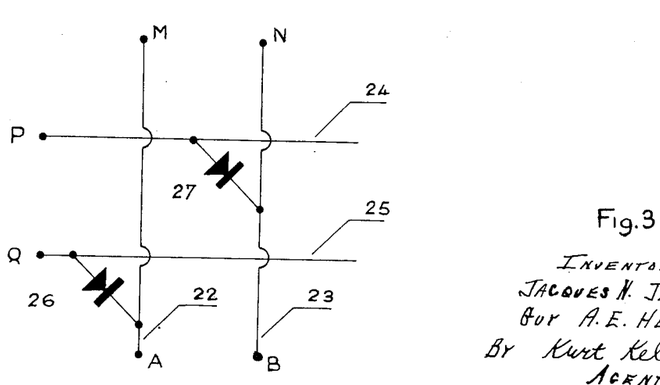
FIGURE 3 is a schematic diagram of a complement-comparison matrix for determining the sense of the error between one number and the complement of another number.

FIGURE 3 represents another type of elementary logical matrix comprising the vertical lines 22, 23 and the horizontal lines 24, 25. A diode 27 is placed at the crossing of lines 24—23 and a diode 26 at the crossing of lines 25—22. Assuming that number 0 is applied to both sets of input terminals, it can be seen that a voltage −U appears on terminal A. If the number 1 were applied to both sets of input terminals, a voltage −U would appear on terminal B. If now the number 0 is applied to input terminals M, N and number 1, to terminals P, Q, no voltage appears on either of terminals A and B. The same occurs for the opposite combination of numbers.

This circuit which will be called a complement-comparison matrix MC has a transfer characteristic which is the opposite of that of matrix MS and realizes the comparison of two binary numbers by delivering a zero voltage on its output terminals when the two numbers are identical and a given voltage on one or the other of its two output terminals when both numbers are identical, the choice of the proper terminal depending on the value of the compared number, whether they are 0's or 1's.

To make clear the practical significance of the two described matrices, all possible combinations of numbers are listed in Table I below.

TABLE I

*Correspondence Between the Direct and the Complement Matrices*

| Number of Combination | Input Terminals | X | Outputs | | Y |
| | | | Direct matrix MS | Complement matrix MC | |
|---|---|---|---|---|---|
| 1 | M, N | 0 | None | A | 1 |
| | P, Q | 0 | | | 0 |
| 2 | M, N | 0 | B | None | 1 |
| | P, Q | 1 | | | 1 |
| 3 | M, N | 1 | None | B | 1 |
| | P, Q | 1 | | | 0 |
| 4 | M, N | 1 | A | None | 0 |
| | P, Q | 0 | | | 0 |

Column X contains the binary numbers effectively applied on the input terminals and column Y contains the binary numbers obtained by complementing one of these numbers, in this case the number applied to terminals M, N.

It can be seen, for example, that the informations delivered on the output terminals of MC correspond to those obtained in comparing a number with the complement of the other, though there has not been made any effective complementing. It can be also noted that the complement matrix does not deliver any information when both input numbers are different, so that their order is of no importance.

Figure 4:
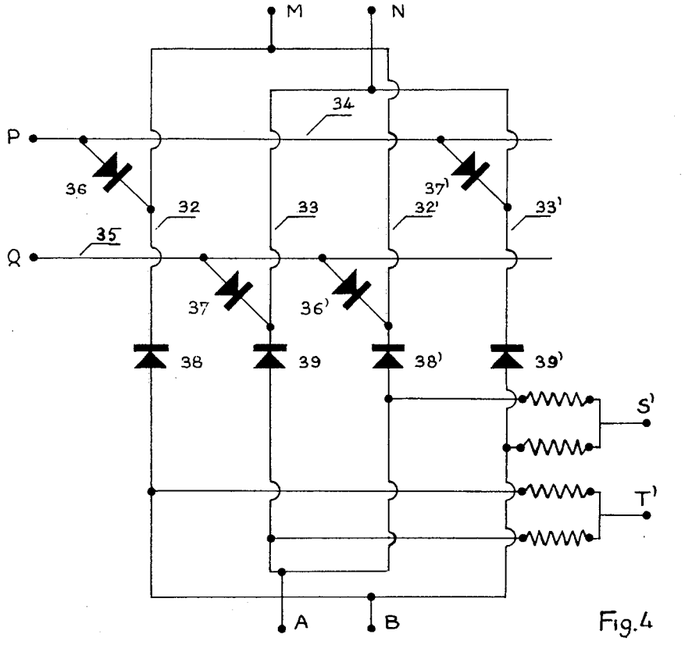
FIGURE 4 is a schematic diagram of a mixed comparison matrix for determining the sense of the error between one number and another number or its complement.

FIGURE 4 represents still another type of elementary logical matrix in which are combined a direct matrix MS as described in connection with FIGURE 2 comprising lines 32, 33, 34, 35 and diodes 36, 37, and a complement matrix MC as described in connection with FIGURE 3, comprising lines 32′, 33′, 34, 35 and diodes 36′, 37′. Diodes 38, 38′, 39, 39′ are utilized to switch between the two matrices by blocking that which is not in use. Assuming that a trigger voltage −V is applied over terminal S′, diodes 38′ and 39′ are non-conducting when a voltage −U, corresponding to a number, is applied on terminals M or N, and the circuit works as a direct matrix. If a trigger voltage −V is now applied over terminal T′ the circuit works as a complement matrix. This matrix, which can be called a mixed matrix MX, realizes either the comparison of two numbers or the comparison of one number with the complement of the other, depending on which of terminals S′ and T′ is energized.

Figure 5:
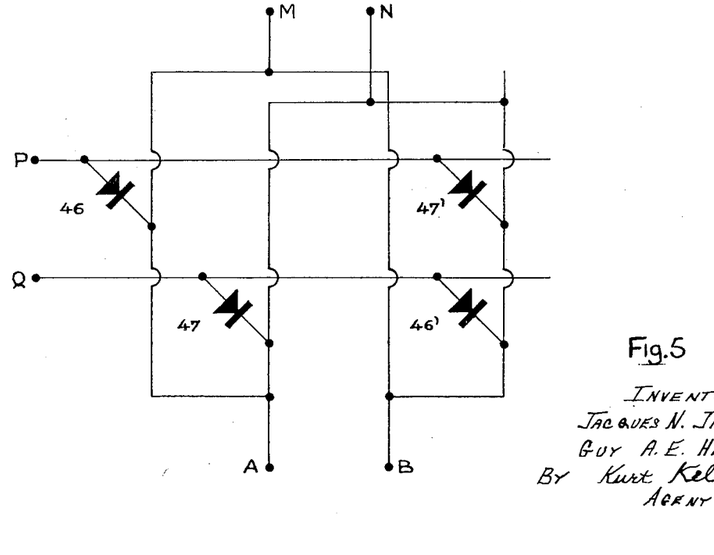
FIGURE 5 is a schematic diagram of a double matrix for determining if two compared numbers are matched or not.

FIGURE 5 represents a matrix constituted by connecting in parallel a direct matrix MS (diodes 46, 47) and a complement matrix MC (diodes 46′, 47′). If the number 0 is applied to both input terminals it can be seen that a signal appears on terminal B. Similarly if number 1 is applied to both input terminals, a signal appears again on terminal B.

If now number 1 is applied to input terminals M, N and number 0 to input terminals P, Q, a signal appears on terminal A. Similarly when the reverse combination of numbers is applied to these input terminals, a signal appears again on terminal A.

This circuit, which will be called a double matrix MD, realizes the comparison of two binary numbers by delivering a given voltage on one of its output terminals when the numbers are matched and on the other terminal when they are mismatched.

Figure 6:
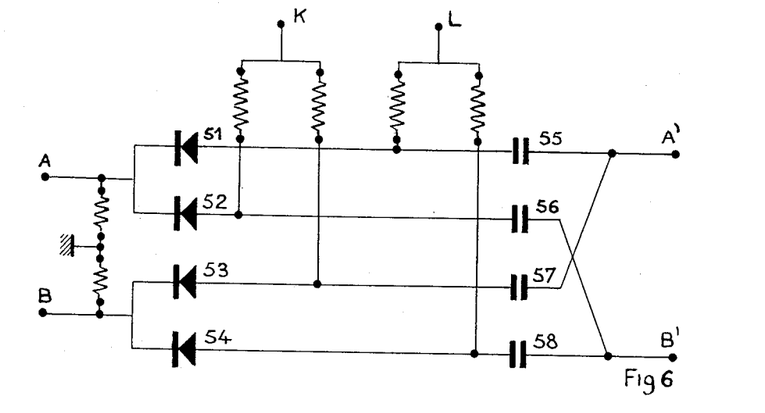
FIGURE 6 is a schematic diagram of an inverter matrix for switching informations applied over two input terminals to either of two output terminals.

FIGURE 6 represents a different type of circuit comprising two input terminals A and B receiving negative pulses and two output terminals A′ and B′. It comprises four circuits, each having in series a diode 51, 52, 53, 54 and a condenser 55, 56, 57, 58. These circuits materialize the four switching possibilities between the input and output terminals. The common point between the diode and the condenser of each of these circuits is connected, through a resistor, to one of the triggering terminals K and L. Assuming that a trigger voltage −V is applied on terminal K, it appears on the anodes of diodes 52 and 53 which are thus non-conducting. If a signal −U is applied for example to terminal A, diode 51 conducts and the signal is transferred to terminal A′. Conversely, if a trigger voltage −V is applied on terminal L, diodes 51 and 54 become non-conducting and if a signal −U is applied to terminal A, diode 52 conducts and the signal is transferred to terminal B′.

This circuit, which is called an inverter matrix I, allows the switching of signals applied over inputs A or B on one or the other of outputs A′ and B′, depending upon which of triggering terminals K and L is energized.

The voltages present on terminals M, N, A, B and A′, B′ of FIGURES 2 to 6 are narrow pulses supplied by generator G of FIGURE 1. In fact, if the logical diode circuits were supplied with D.C. current, this would necessitate stabilizing circuits. If they were supplied with A.C. current it would need high capacitance condensers whose discharge would tend to block the diodes.

These impulsions being compared in the diodes to voltages delivered by bistable devices commonly called flip-flops as is described later, they must have the same polarity as these voltages. In the course of this description, the flip-flops are assumed to be equipped with PNP transistors whose collectors are supplied by a negative source, hence the impulsions must be negative. In case the flip-flops should be equipped with NPN transistors, cold- or hot-cathode tubes, the impulsions would be positive. The choice of PNP transistors is evidently given as a non-limitative example.

In the circuits described with reference to FIGURES 2 to 5, the binary digits applied to terminals PQ and constituting the number sent by the reference member can be delivered directly over two channels. In the course of this description they are shown as delivered over one channel to input terminal P of a flip-flop (FIGURES 7 and 10), number $\underline{1}$ being materialized by a negative D.C. voltage and number $\underline{0}$ by a zero voltage. The flip-flop delivers then voltages on either of its two output terminals P and Q. The binary digits applied to terminals M, N constituting the number sent by the controlled member are delivered by a spatial coding device well known in the analog-digital-conversion art wherein the signal characterizing a given digit is supplied through a pair of complementary tracks in accordance with their state of conductivity, as when one of these is rendered electrically conducting while the other is made non-conducting by means of electric contacts cooperating with both positions. In order to avoid ambiguities at sector boundaries the two tracks overlap slightly and during a short period terminals M and N are short-circuited. In the circuit of FIGURE 2, if A voltage —U is applied to terminal M, corresponding to number $\underline{0}$, and a voltage —V is applied to terminal P, corresponding to number $\underline{1}$, it means that the number $\underline{0}$ delivered by the spatial encoder must become $\underline{1}$ to match the two numbers. As described before, the matrix delivers a signal on terminal B and the encoder displaces itself until terminals M and N are short-circuited. It can be seen that at that moment a voltage —U is impressed on lines 12 and 13. Diode 17 bypasses the signal to ground and diode 16 is always non-conducting. A signal is always present over terminal B. The encoder thus moves further until number $\underline{1}$ be applied over terminal N. At that moment the matrix compares $\underline{1}$ with $\underline{1}$ and does not deliver any further signal.

The binary numbers applied to terminals P, Q can also be delivered directly over one or two channels by a spatial encoder which allows for bringing the displacement of a member under control of the displacement of a second one.

The principle of the digital servo system as per the invention is valid for all types of binary codes. In the following description given by way of a non-limitative example two practical circuits are described wherein the informations to be compared are expressed in the natural code and in the reflected code.

Figure 8:
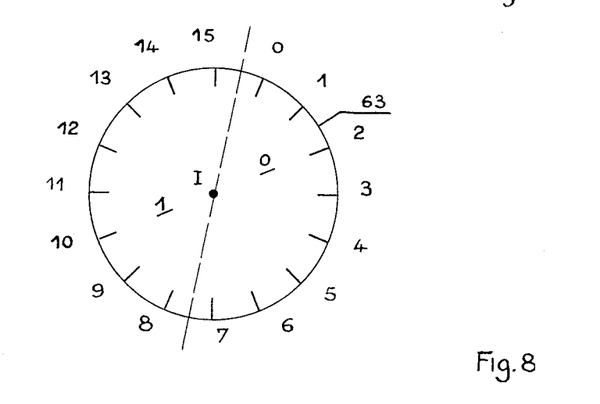
FIGURE 8 shows the display circle on the circumference of which are equally spaced the 16 positions of a 4-digit binary code.

The examples will be given in a 16-position, 4-digit code. FIGURE 8 represents in decimal code these 16 positions equally spaced on a circumference 63 called display circle. This circle can be divided into two 180° sectors or half-circles by a dashed line as shown. The right half-circle contains the decimal positions 0 to 7 corresponding to binary numbers whose first digit is $\underline{0}$ and the left half-circle contains the decimal positions 8 to 15 corresponding to binary numbers whose first digit is $\underline{1}$.

Two multi-digit different binary numbers will be compared in the digital system as per the invention in order to deliver an error information characterizing the direction of the shorter path for annulling that error and consequently matching both numbers. In the case when both numbers are placed in the same half-circle the error information gives directly the shorter path as it is indeed the only one which can occur in the considered half-circle. But when the two numbers are placed in different half-circles, there are two possible paths and it is necessary to discriminate between them as obviously one of these is shorter than the other (except in the particular case when the two numbers are diametrically opposite). A unique method is utilized for effecting this discrimination and consists in bringing the positions of compared numbers to the same half-circle by rotating the position of one of the numbers by 180°. The comparison is brought back to that effected in the former case but, as this operation has inverted the respective positions of the numbers, the error information must be inverted to obtain the proper information. The direction of rotation determined by that new error information corresponds then truly to the shorter path as the two compared numbers and the displaced one are all three placed in the same 180° sector.

This 180° rotation of the position of one of the numbers is obtained in practice by dropping the first digit of the two numbers. The position of the number whose first digit was $\underline{0}$ is not modified. That of the number whose digit 1 was $\underline{1}$ is rotated 180° on the display circle. In the natural binary code, for example, 1011 corresponds to 11 decimal. If digit 1 of this number is dropped, there remains number 011 which corresponds to 3 decimal which is truly at 180° from decimal number 11 on the display circle. To obtain the same result in the reflected code, it is necessary to complement the second digit of the number whose first digit is $\underline{1}$. For example 1110 reflected=11 decimal. After dropping the first digit and complementing the second digit, the resulting number is 010 reflected=3 decimal.

Figure 7:
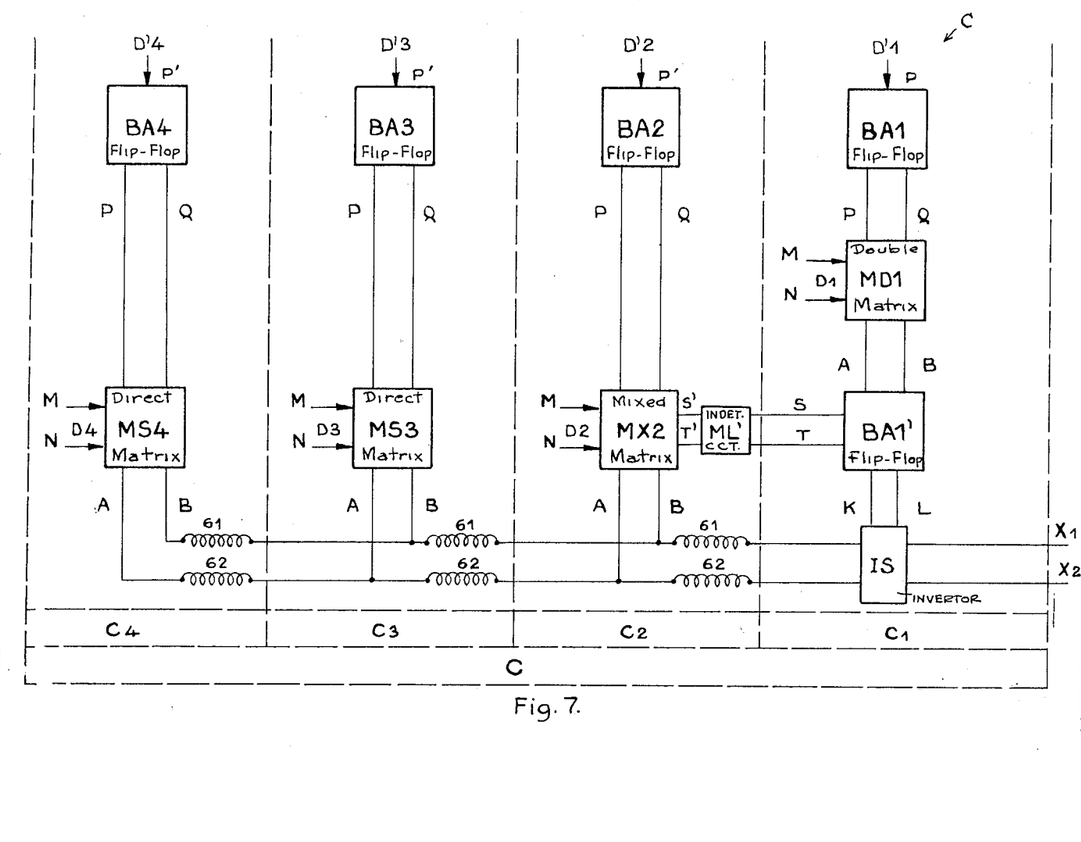
FIGURE 7 is a detailed block diagram of the digital servo system operating on numbers in natural binary code.

FIGURE 7 is a general diagram of the digital servo system operating on the natural binary code when the encoder moves on an endless path.

The circuit shown on the figure by way of example operates on a 16-position code expressed by 4-digit numbers: D1, D2, D3, D4 for the present position and D'1, D'2, D'3, D'4 for the ordered or command position.

The digit circuits C1 to C4 operate differently. The circuit C1 is only used for determining if the compared digits, D1 and D'1, are identical or different. The information delivered by this circuit modifies that delivered by circuit C2, C3 and C4. If D1 and D'1 are matched, i.e. when the two compared numbers are in the same half-circle of the display circle of FIGURE 8, C1 does not deliver any information and the comparison is made only in circuits C2, C3 and C4. Each of these circuits operates separately delivering an information relative to the sense of the error.

Circuit C2 is however slightly different from the two others and operates in a peculiar way but only when the two numbers are exactly 180° apart and its operation will be described later.

Each of the circuits C3 and C4 comprises a flip-flop BA3, BA4 whose respective output lines P, Q are connected to the corresponding inputs of a direct-comparison matrix MS3, MS4 as described with reference to FIGURE 2.

If for example the number of present position applied on inputs M, N is $\underline{0}$ and that of new position applied on inputs P, Q is $\underline{1}$ and assuming that $\underline{1}>\underline{0}$, the correspondence table between direct and complement matrices (Table 1) shows, in the column corresponding to MS, that negative impulsions (which will be called "information") will appear on terminal B characterizing the sense of the error. It can thus be stated that the sense of displacement which brings an object from position $\underline{0}$ to position $\underline{1}$ or from one position to a higher one in terms of decimal equivalents (display circle of FIGURE 8) is determined by an information appearing on terminal B, and vice versa. These two senses of displacement can also be called respectively clockwise and counterclockwise.

It is evident that these conventions are valid only if a number whose rank is higher than that of another is effectively greater than that number, which is true in the natural binary code. Output terminals A, B of the digit circuits are connected to the output lines or buses X1 and X2 comprising inductors 61, 62 inserted between successive digit circuits. The inductors act as delay elements and convert the parallel input informations into serial output. When the input informations are applied in serial form, beginning with the first digit, these inductors are suppressed.

An example of operation of the system will now be given in the case when the two positions are in the same half-circle. It will be recalled that, in that case, circuit C2 operates in the same way as circuits C3 and C4.

Let
$$Pr=2=0010 \text{ (present position)}$$
$$Ne=5=0101 \text{ (new position)}$$

If $Dp$ and $Dn$ are the digits of these numbers and for example $Dp2$ and $Dn2$ represent their second digits, $Dn2=1$ and $Dp2=0$. As $Dn2>Dp2$ an information appears on terminal B of circuit C2. Similarly $Dn3<Dp3$ and an information appears on terminal A of circuit C3. $Dn4>Dp4$ and an information appears on terminal B of C4. The result of the comparison is a serial train of informations B–A–B which is applied to the inputs of the motor matrix MM which is so designed that only the most significant information, in this case that delivered by circuit C2, imposes the sense of rotation upon the motor. The object will thus be moved in the clockwise direction which is correct.

This displacement will bring the object to the next position:
$$Pr=3=0011$$
$$Ne=5=0101$$

Now, again, $Dn2>Dp2$—an information appears on lead B of circuit C2 and the object moves clockwise.

There now occurs
$$Pr=4=0100$$
$$Ne=5=0101$$

Since $Dn4>Dp4$, an information appears on lead B of circuit C4 and the object moves clockwise until $Pr=Cd=5$, i.e. the present position ($Pr$) corresponds to the ordered or command position ($Cd$).

Digit circuit C1 comprises a flip-flop BA1 whose outputs A, B are connected to the corresponding inputs of a double matrix MD1 as described with reference to FIGURE 5. Outputs A, B of this matrix are connected to the corresponding inputs of a flip-flop BA1' whose output lines K, L are connected to the corresponding inputs of an inverter IS, as described in connection with FIGURE 7, placed on buses X1, X2. Two other output terminals S, T are connected to digit circuit C2. Circuit C1 compares the first digits of the two numbers and delivers an information on output A if they are different and on output B when they are equal.

This information is applied to flip-flop BA1' which delivers negative voltages on its outputs K and S if an information or signal is present on B or on its outputs L and T if an information is present on A.

When matrix MD1 delivers an information on B, a voltage appears on terminal K and the inverter IS does not modify the transmission of the informations on buses X1, X2.

When an information is delivered on A, a voltage appears on L and inverter IS complements the digital information by switching the incoming signals from one line to the other.

In short, if the two first digits are mismatched, and only in that case, the sense of the displacement determined by the comparison of the most significant digits is inverted.

For example:
$$Pr=7=0111$$
$$Ne=8=1000$$

The relationship $Dn2<Dp2$ would determine a counterclockwise displacement which is not correct. It is thus necessary to complement.

Similarly, if
$$Pr=3=0011$$
and
$$Cd=13=1101$$

$Dn2>Dp2$ which would determine a clockwise displacement which is not correct as the shorter path is obviously in the opposite direction. It is also necessary to complement.

In the particular case when the two numbers are placed 180° apart on the display circle of FIGURE 8, the numbers compared in digit circuits C2, C3, C4 are identical and no information appears on output buses X1, X2.

In order to get an information even in that case, circuit C2 is designed so that the second digit of new position is complemented after a short period. It comprises a flip-flop BA2 whose outputs P, Q are connected to the corresponding inputs of a mixed matrix MX2, as described with reference to FIGURE 4. The switching of this matrix is ordered by the voltages which are delivered on terminals S or T by digit circuit C1 and are applied to MX2 on S' or T' through indetermination circuit ML' as per FIGURE 9. It has been previously explained that, when the first digits of the two numbers are identical, flip-flop BA1' delivers a voltage —V on terminal S. This voltage makes diode 68 (FIGURE 9) conductive, charges condenser 65 and appears on S'. Matrix MX2 is then operated as a direct-comparison matrix.

Figure 9:
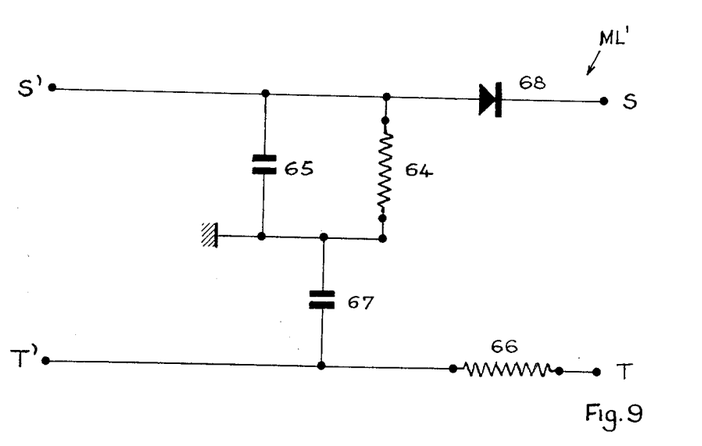
FIGURE 9 is an indetermination circuit in natural binary code.

When the first digits of the two numbers are different, flip-flop BA1' delivers a voltage —V on terminal T and terminal S is grounded. Diode 68 is blocked and the voltage present on S' decreases to zero at a speed determined by the characteristics of resistor-capacitor network 64—65. During that time, network 66—67 charges until a trigger voltage appears on T' for triggering MX2 into a complement matrix. In short, when the first digits are different MX2 operates first as a direct matrix and, after a given period of time, changes into a complement matrix if the first comparison has not given any result.

For example
$$Pr=3=0011$$
$$Ne=11=1011$$

The second, third and fourth digits being matched, MX2 becomes a complement matrix. The correspondence table between the direct and complement matrices (Table 1) shows that as $Dn2=Dp2=0$ before complementing, an information appears on A determining a counterclockwise displacement.

Figure 10:
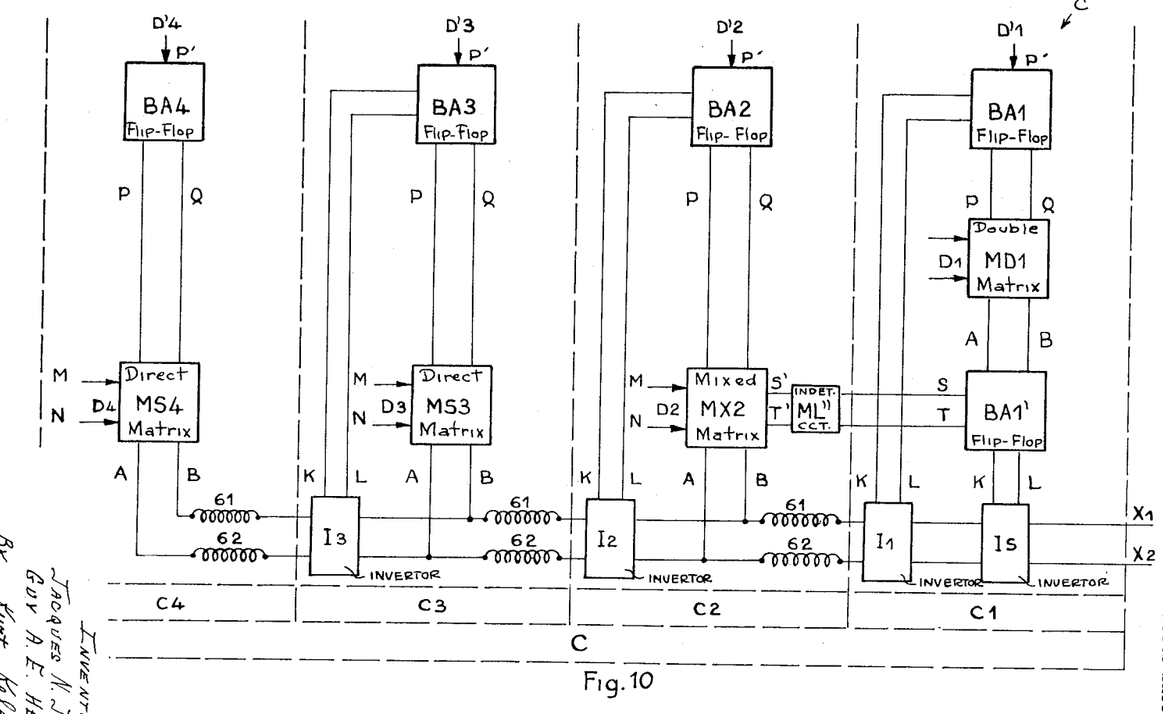
FIGURE 10 is a detailed block diagram of a component of the digital servo system operating or numbers in reflected binary code.

FIGURE 10 is a general diagram of a component of the digital servo system operating on the reflected binary code when the encoder moves on an endless path. This system comprises the same elements as those shown in FIGURE 7 for the natural code except that inverter matrices I1, I2, I3 have been inserted between adjacent digit circuits and are actuated by the immediately preceding higher-order digit circuit. This modification is necessary as the inequality $\underline{1}>\underline{0}$ is no longer true in this code, i.e. a number whose rank is higher than another's is not necessarily greater than that number. For example:

$$11=1110$$
$$12=1010$$

Number 1010 is smaller than number 1110, though it occupies a higher rank. The informations delivered by the digit circuits cannot therefore give the true sense of the error and will be altered in a way which shall be explained by way of examples. These examples will make use of numbers whose first digits are matched to make the explanation easier.

Let:

(a) $Pr=10=1111$
$Ne=11=1110$  $Dn4<Dp4$ (b) $Pr=12=1010$
$Ne=13=1011$  $Dn4>Dp4$

In the pair of numbers (a), the first mismatched digits are the fourth digits. An information appears on A determining a counterclockwise displacement which is not correct. It is to be noted that the three digits which precede the first pair of mismatched digits comprise three 1's, thus an odd number of 1's.

In the pair of numbers (b) the first mismatched digits are also the fourth digits. An information appears on B determining a clockwise displacement which is correct. It is to be noted that the first three digits comprise two 1's, thus an even number of 1's. Other examples could be cited which would lead to the following law which is a variant of that sometimes utilized for converting reflected binary numbers into natural binary ones:

When two reflected binary numbers are compared digit by digit, the circuits deliver a true information on the sense of the error between these numbers if the number of 1's preceding the compared digit is even or zero. If the number of 1's preceding the compared digits is odd, the delivered information must be complemented. This transformation is effected in the inverter matrices I1, I2, I3 of FIGURE 10, each of these being switched in the inversion position when the new position number in the preceding digit circuit is 1.

Digit circuits C1, C3 and C4 are identical with those utilized in the circuit of FIGURE 7 and operate in the same way.

Digit circuit C2 is also identical with that of FIGURE 7 but works in a different way, as explained before, since, when the first digits mismatch, it is necessary to complement the second digit of one of the numbers except when they are 180° apart on the display circle of FIGURE 8. In that case the numbers effectively compared are identical and the circuit does not deliver any information. It is consequently necessary to complement one of the second digits only during a short period, after which the two numbers are compared directly.

Figure 11:
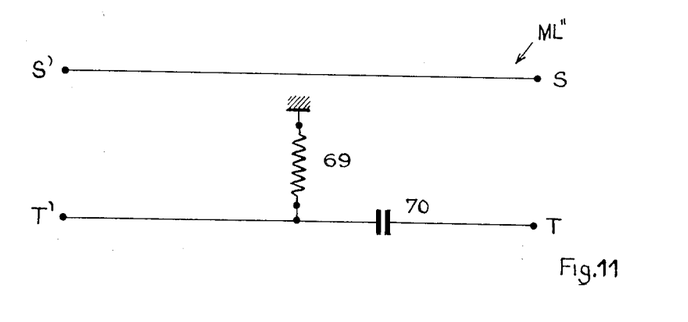
FIGURE 11 is an indetermination circuit in reflected binary code.

FIGURE 11 represents the indetermination circuit ML″ placed between flip-flop BA1′ and matrix MX2 and comprises a resistor-capacitor network 69—70 inserted on conductor T—T′.

When the first digits of both numbers are matched, BA1′ delivers a voltage —V on terminal S which appears also on S′ and is applied to the corresponding terminal of matrix MX2 which becomes a direct comparison matrix. When the first digits are mismatched, BA1′ delivers a voltage —V on terminal T. The charge current of capacitor 70 creates across resistor 69 a voltage drop which is applied to terminal T′ for converting MX2 into a complement matrix. When condenser 70 is charged, the current in resistor 69 decreases as well as the potential of terminal T′ and the four diodes 38, 38′, 39, 39′ (FIGURE 4) of matrix MX2 are conducting.

This has no importance as it only happens when the comparison in the complement matrix has given no result.

For example $Pr=7=0100$
$Ne=10=1111$ (1) $Dp1 \neq Dn1$, MX2 becomes a complement matrix;
(2) $Dp2=Dn2=1$ (Table 1) shows that the digit circuit C2 delivers an information on its terminal B.

The inequality (1) imposes an inversion in IS and, as number Ne comprises one digit 1 placed before the compared digits, the information must be once more inverted in I1. After these two inversions, the information is again of the B type and shows that the displacement must be clockwise which is correct.

As another example:

$Pr=13=1011$
$Ne=4=0110$ $Dp1 \neq Dn1$, MX2 becomes a complement matrix;
$Dp2=0$ and $Dn2=1$. The digit circuit C2 does not deliver any information.

$Dn4<Dp4$—an information appears on terminal A and is inverted through IS and also through I2 and I3. It is finally of the B type which shows a clockwise displacement which is correct.

In the particular case when the two numbers are 180° apart, the numbers compared in C2, C3, C4, after complementing the second digit of one of them, are matched and the system does not deliver any information.

For example $3=0010$
$11=1110$ which becomes 010
010 after complementing the second digit of the bottom number. But it has been explained before that the complementing lasted only for a short period. After that time the compared numbers become:

010
110

Thus C2 delivers a displacement information.

When the displacement of the object is limited over a closed path, there remains only one possible path and it is no longer necessary to compare the two numbers in the same half-circle. Digit circuits C1 and C2 of FIGURES 7 and 10 are therefore equipped with direct-comparison matrices MS and inverter IS is suppressed. In the case of the reflected code, inverters I1, I2, I3 are still used for converting the output informations.

For example if a stop is placed on position zero of the encoder and if $Pr=3=0011$ (in natural code),
$Ne=14=1110$ (in natural code), $Dn1>Dp1$ indicates a clockwise displacement, which is correct, though the numbers are more than a half-circle apart.

In the case when the two numbers are 180° apart there is always an information as their first digits are unmatched.

Figure 12:
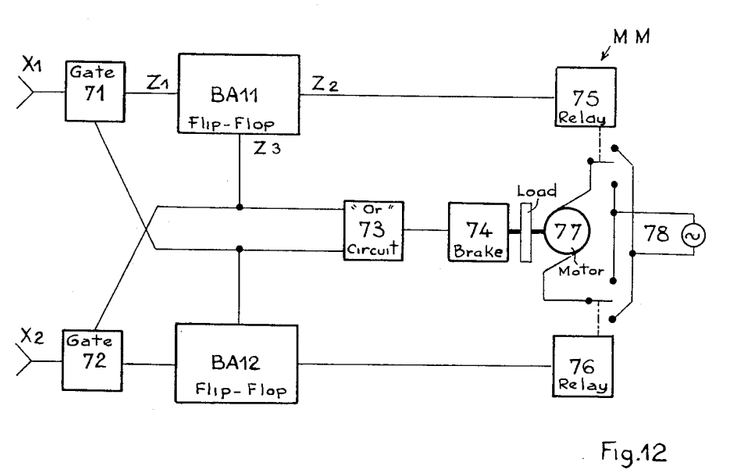
FIGURE 12 is a detailed block diagram of the motor matrix.

FIGURE 12 is the functional diagram of the control matrix MM of the motor. It comprises two input buses X1 and X2 connected to the corresponding buses of the circuits of FIGURES 7 and 10. Each of these buses is connected to the symmetrical input of a flip-flop, BA11 or BA12 and to a mechanical relay 75 or 76 with a single-pole double-throw contact set which energizes motor 77. This motor comprises an electrical brake 74 which is controlled by the "OR" circuit 73 which receives its actuating signal from either flip-flop BA11 or flip-flop BA12. Gate circuits 71 and 72 inserted on buses X1 and X2 block the bus which is not in use but are in their open state when no signal is applied on buses X1 and X2.

Figure 13:
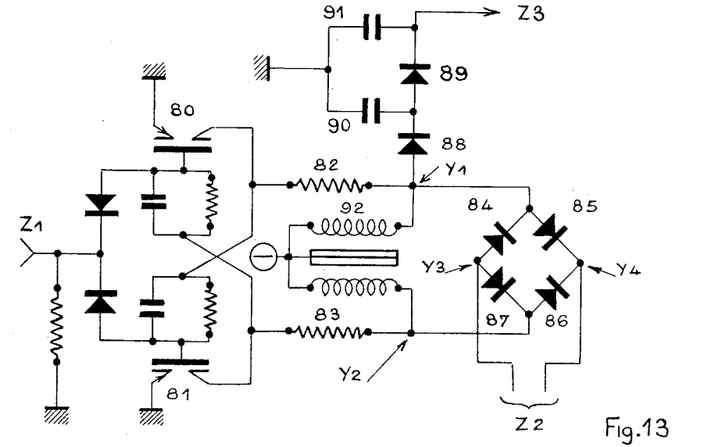
FIGURE 13 is a schematic diagram of a flip-flop circuit of the motor matrix.

FIGURE 13 is a simplified wiring diagram representative of flip-flops BA11 and BA12 wherein two PNP transistors 80 and 81 operate in a well-known manner except that both collectors are loaded, though resistors 82 and 83, by a common pulse transformer 92 with reduced-band-pass characteristics. At each pulse applied on terminal Z1, the flip-flop changes its state and two rectangular and outphased rectangular pulses are applied to transformer 92 which differentiates them. The resulting pulses appear at Y1 and Y2 and are applied to the rectifier bridge 84, 85, 86, 87 which delivers, on its outputs Y3, Y4 (output Z2 of the flip-flops), a direct voltage which is used first to block gate 71 or 72 and second to actuate brake 74 (FIGURE 12) through the "OR" circuit 73. A load operated by the system has been schematically shown on the shaft of motor 77.

The control matrix MM of FIGURE 12 works as follows. When, for example, an information delivered by the digit circuits of FIGURES 1, 7 and 10 and materialized by a series of short pulses is present on line X1, it characterizes a given sense of rotation. These pulses are applied to circuit BA11 on terminal Z1 as gate 71 is in its open state. The direct voltage appearing on terminal Z2 energizes relay 75 which in turn switches on the supply voltage of the motor 77 with such a polarity that it rotates in the proper sense. The direct voltage present on terminal Z3 is applied to gate 72 which blocks bus X2, thus preventing any signal from propagating on this line as long as there are pulses present on bus X1. This voltage is also applied to circuit 73 which unblocks brake 74. When there are no more pulses on X1, there are no more voltages on Z3 and Z2. The brake blocks the motor, relay 75 opens and the motor 77 is no longer energized.

In the previously given example of operation of the system, with both numbers expressed in natural binary code, the comparison between the present-position number 0010=2 decimal and the new-position number 0101=5 decimal yields a train of informations B–A–B or X1–X2–X1.

As long as pulses of the first information X1 are applied over input terminal of gate circuit 71 the motor rotates clockwise until the present-position number becomes 0011=3 decimal and the comparator delivers a new train of informations X1–X2. As the X1 information, obtained from a signal delivered by the encoder, is of a continuous nature and has not changed from one position to the next, the X2 information is not utilized.

A preferred embodiment of the invention has been described, but many variations will be apparent to those skilled in the art.

What is claimed is:

1. An electrical servo system responsive to the digits of two $n$-digit binary numbers of which one identifies the present position of a controlled element having $2^n$ possible positions located along a given path whereas the other identifies a command position to which the controlled element is to be displaced, comprising reversible drive means for displacing said element along said path in either of two opposite directions, a plurality of comparison circuits, a pair of leads common to all of said circuits, coding means for applying to said circuits first input signals representative of respective digits of a binary number identifying said present position, control means for concurrently applying to said circuits second input signals representative of corresponding digits of a binary number identifying said command position, each of said comparison circuits including means for deriving from the applied input signals, in the absence of identity between the two digits represented thereby, either of two types of control signals respectively indicating a value of unity for the present-position digit and for the command-position digit, output means connected to said circuits for sequentially applying said two types of control signals to said leads, respectively, in the order of decreasing rank of the digits associated with the respective comparison circuits, and energizing means for said drive means connected to said leads for advancing said controlled element in response to the first control signal of a succession of such signals and in a sense determined by the identity of the lead over which said first control signal is received, said energizing means comprising a pair of pulse generators respectively connected to said leads for actuation by said control signals, switch means responsive to a pulse from either of said generators for momentarily energizing said drive means in either of said directions according to which generator is operative, and blocking means connected to said generators for disabling each of said generators upon the actuation of the other generator.

2. A servo system according to claim 1, further comprising brake means normally maintaining said drive means stationary, and release means for said brake means connected to said energizing means for maintaining said brake means inoperative in the presence of a control signal on either of said leads.

3. An electrical servo system responsive to the digits of two $n$-digit binary numbers of which one identifies the present position of a controlled element having $2^n$ possible positions located along a closed path whereas the other identifies a command position to which the controlled element is to be displaced, comprising reversible drive means for displacing said element along said path in either of two opposite directions; a plurality of comparison circuits; coding means for applying to said circuits first input signals representative of respective digits of a binary number identifying said present position; control means for concurrently applying to said circuits second input signals representative of corresponding digits of a binary number identifying said command position; said circuits including a first comparison circuit whose input signals are representative of the highest-ranking digit of each of said numbers, a second comparison circuit whose input signals are representative of the second-ranking digit of each of said numbers, and $(n-2)$ further comparison circuits whose input signals are respectively representative of the remaining digits; said first comparison circuit including means for deriving from the applied input signals a switching signal indicating non-identity of the highest-ranking digits of said numbers; said second and further comparison circuits each including means for deriving from the applied input signals non-identity signals of a first type upon the associated digit of a given one of said numbers being zero and of a second type upon said associated digit being unity; a first and a second lead common to all of said comparison circuits other than said first circuit for said non-identity signals of first and second type, respectively; output means connected to said second and further comparison circuits for sequentially applying said non-identity signals to the corresponding leads in the order of decreasing rank of the associated digits; inverter means connected across said leads and coupled to said first comparison circuit for interchanging said non-identity signals on said leads in response to said switching signal; and energizing means for said drive means connected to said leads for advancing said controlled element in response to the first non-identity signal of a succession of such signals and in a sense determined by the identity of the lead over which said first non-identity signal is received.

4. A servo system according to claim 3 for use with numbers expressed in reflected binary code, further comprising switchover means in said second comparison circuit for modifying the non-identity signal thereof in a manner indicating a divergence between the second-ranking digit of said given one of said numbers and the complement of the second-ranking digit of the other number, and selector means connected to said first comparison circuit for actuating said switch-over means in response to said switching signal.

5. A servo system according to claim 4, further comprising a plurality of additional inverter circuits each connected across said leads ahead of each of said comparison circuits other than said first circuit for interchanging the non-identity signals thereof on said leads, said control means including a like plurality of discriminator circuits respectively connected to said inverter circuits for actuating them in response to a value of unity in the next-higher-ranking command-position digit whereby the number of additional inversions of said non-identity signals is determined by the number of preceding unity digits in the command-position number.

6. An electrical servo system responsive to the digits of two $n$-digit binary numbers of which one identifies the present position of a controlled element having $2^n$ possible positions located along a closed path whereas the other identifies a command position to which the controlled element is to be displaced, comprising reversible drive means for displacing said element along said path in either of two opposite directions; a plurality of comparison circuits; coding means for applying to said circuits first input signals representative of respective digits of a binary number identifying said present position; control means for concurrently applying to said circuits second input signals representative of corresponding digits of a binary number identifying said command position; said circuits including a first comparison circuit whose input signals are representative of the highest-ranking digit of each of said numbers, a second comparison circuit whose input signals are representative of the second-ranking digit of each of said numbers, and $(n-2)$ further comparison circuits whose input signals are respectively representative of the remaining digits; said first comparison circuit including means for deriving from the applied input signals a switching signal indicating non-identity of the highest-ranking digits of said numbers; said second comparison circuit including switchover means and means controlled by said switchover means for deriving from the applied signals non-identity signals resulting from a comparison of the second-ranking digit of a given one of said numbers with the second-ranking digit of the other number in a first state of said switchover means and from a comparison of the second-ranking digit of said given one of said numbers with the complement of the second-ranking digit of the other number in a second state of said switchover means; each of said further comparison circuits including means for deriving from the applied signals non-identity signals resulting from a comparison of respective lower-ranking digits of said numbers; all of said non-identity signals being of a first type upon the associated digit of said given one of said numbers being zero and of a second type upon said associated digit being unity; selector means connected to said first comparison circuit and responsive to said switching signal for temporarily maintaining said switch-over means in one of its states and subsequently changing it to the other state; a first and a second lead common to all of said comparison circuits other than said first circuit for said non-identity signals of first and second type, respectively; output means connected to said second and further comparison circuits for sequentially applying said non-identity signals to the corresponding leads in the order of decreasing rank of the associated digits; inverter means connected across said leads and coupled to said first comparison circuit for interchanging said non-identity signals on said leads in response to said switching signal; and energizing means for said drive means connected to said leads for advancing said controlled element in response to the first non-identity signal of a succession of such signals and in a sense determined by the identity of the lead over which said first non-identity signal is received.

7. A servo system according to claim 6, further comprising a plurality of additional inverter circuits each connected across said leads ahead of each of said comparison circuits other than said first circuit for interchanging the non-identity signals thereof on said leads, said control means including a like plurality of discriminator circuits respectively connected to said inverter circuits for actuating them in response to a value of unity in the next-higher-ranking command-position digit whereby the number of additional inversions of said non-identical signals is determined by the number of preceding unity digits in the command-position number, said selector means being adapted to maintain said switchover means initially in said second state whereby the system will correctly respond to numbers expressed in reflected binary code.

References Cited in the file of this patent

UNITED STATES PATENTS

| | | |
|---|---|---|
| 2,418,351 | Jackson | Apr. 1, 1947 |
| 2,727,194 | Seid | Dec. 13, 1955 |
| 2,823,344 | Ragland | Feb. 11, 1958 |
| 2,823,345 | Ragland | Feb. 11, 1958 |
| 2,873,439 | Lahti et al. | Feb. 10, 1959 |
| 2,885,613 | Myracle et al. | May 5, 1959 |
| 2,878,434 | Brown | Mar. 17, 1959 |
| 2,922,940 | Mergler | Jan. 26, 1960 |